United States Patent [19]
Gulotta

[11] 3,970,442
[45] July 20, 1976

[54] METHOD OF INTRODUCING PROTECTIVE ATMOSPHERE GASES INTO A GLASS FORMING CHAMBER

[75] Inventor: Joseph A. Gulotta, New Kensington, Pa.

[73] Assignee: PPG Industries, Inc., Pittsburgh, Pa.

[22] Filed: July 16, 1975

[21] Appl. No.: 596,495

[52] U.S. Cl. ................................. 65/32; 65/65 A; 65/99 A; 65/182 R
[51] Int. Cl.² ........................................ C03B 18/02
[58] Field of Search......... 65/65 A, 99 A, 32, 182 R

[56] References Cited
UNITED STATES PATENTS

| | | | |
|---|---|---|---|
| 3,083,551 | 4/1963 | Pilkington | 65/32 |
| 3,241,938 | 3/1966 | Michalik | 65/99 A |
| 3,356,476 | 12/1967 | Gulotta | 65/99 A |
| 3,721,543 | 3/1973 | Classen et al. | 65/182 R X |

*Primary Examiner*—Arthur D. Kellogg
*Attorney, Agent, or Firm*—E. Kears Pollock

[57] ABSTRACT

A glass forming chamber in which glass is formed into a continuous sheet by floating it on the surface of molten metal is provided with a first protective atmosphere gas in an enclosed shell above a refractory roof in the chamber and with a second protective atmosphere gas in the headspace of the operating portion of the chamber in the vicinity of the glass being formed. The second protective atmosphere gas is more reducing than the first. For example, the first protective atmosphere gas may be nitrogen while the second protective atmosphere gas is a mixture of nitrogen and hydrogen.

7 Claims, 2 Drawing Figures

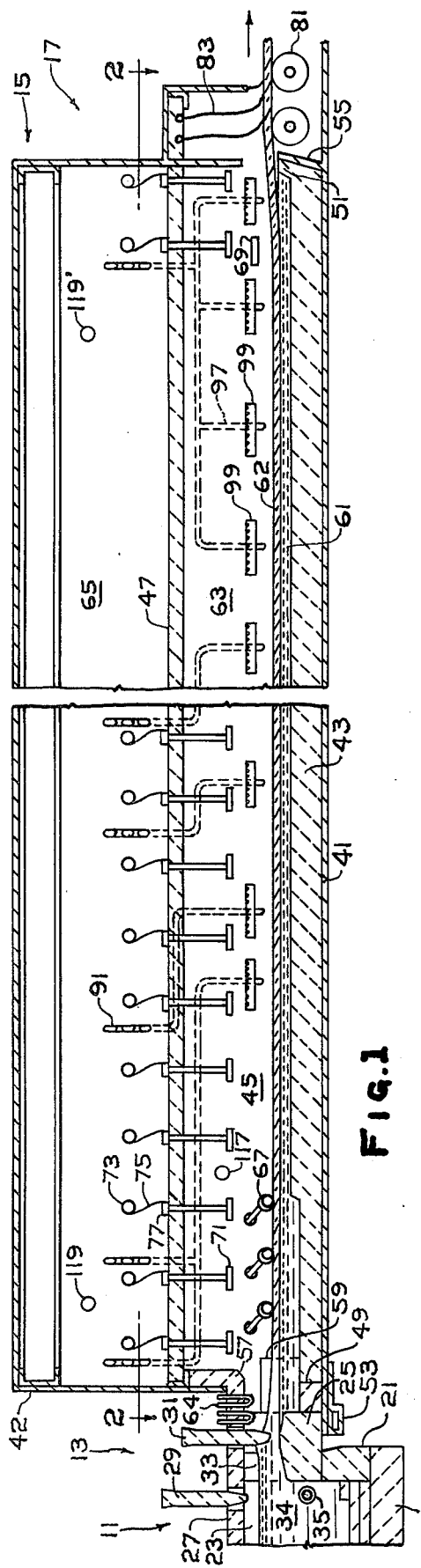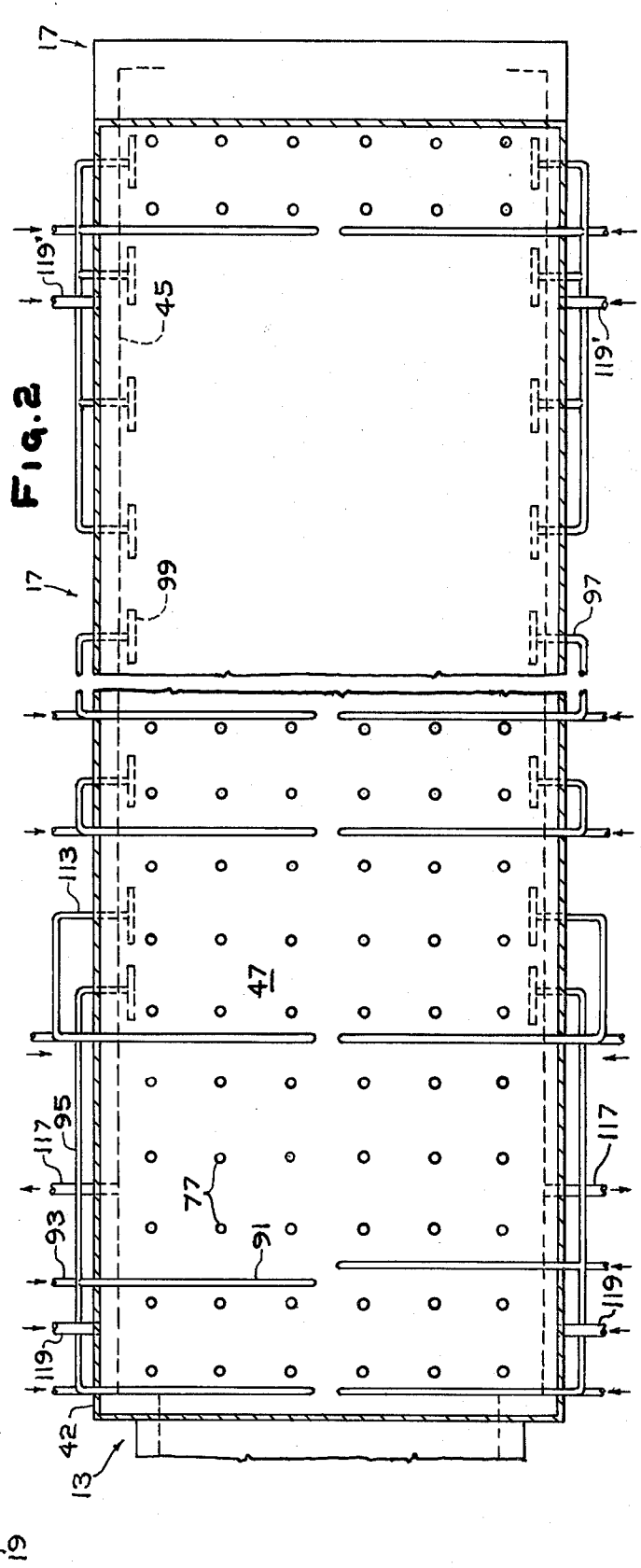

METHOD OF INTRODUCING PROTECTIVE ATMOSPHERE GASES INTO A GLASS FORMING CHAMBER

BACKGROUND OF THE INVENTION

1. Field of the Invention:

The present invention relates to an apparatus and method for manufacturing flat glass in which the glass is formed while being supported on the surface of the pool of molten metal. More particularly, this invention relates to a method for introducing protective atmosphere gases into a headspace of the chamber in which the glass is formed.

2. Brief Description of the Prior Art:

In a variety of processes a continuous sheet of ribbon of glass is formed while supported on and advancing along the surface of a pool of molten metal. In general, a protective, nonoxidizing atmosphere is provided in a headspace above the advancing glass and the molten metal supporting it in order to prevent the oxidation of the molten metal and consequent contamination of the glass. Several patents illustrating the use of protective atmosphere to protect molten metal in this environment are U.S. Pat. No. 3,241,937 to Michalik et al; U.S. Pat. No. 3,337,322 to Taylor; U.S. Pat. No. 3,356,476 to Gulotta; U.S. Pat. No. 3,551,126 to Sacrez et al and U.S. Pat. No. 3,630,701 to Javaux et al. All of these patents show the introduction of protective atmosphere gases into a headspace overlying an advancing body of glass that is being formed into a continuous sheet and over a pool of molten metal that supports the advancing glass. The headspace into which the protective atmosphere gases are introduced is defined by the side walls and end walls of the forming chamber and by some overlying ceiling or roof spaced above the advancing glasses and its supporting metal.

As shown in U.S. Pat. No. 3,468,869 for example, electrical heating elements for controlling the temperature of the forming chamber may be mounted in a refractory ceiling above the glass. The ceiling, which extends over the advancing glass and its supporting metal, may be separated from and enclosing within an outer shell or casing as shown in U.S. Pat. No. 3,721,543 to Classen et al. Such an arrangement is shown generally for electrically heated enclosures in U.S. Pat. No. 2,543,708 to Rice et al. The patent of Rice et al shows a double-walled furnace having an inner wall like the ceiling of a glass forming chamber made of refractory material surrounded by an outer metallic wall or casing. Electric heaters extend through the inner wall to maintain the temperature within the interior space.

According to the disclosure of Rice et al, a suitable gaseous mixture for introduction into the inside chamber defined by the inner wall is introduced into the space between the inner and outer walls and allowed to diffuse through the inner wall into the furnace. While passing through the space between the inner and outer walls, such a gas inherently removes some heat from the electric heaters and their connections to conductors located within the space between the inner wall and outer wall of the disclosed furnace or chamber.

In the past it has been common to introduce protective gases of differing compositions into different portions of the space or plenum above the ceiling of a forming chamber so that controlled amounts of a reducing gas would flow down through the ceiling at different locations along the length of the chamber. For example, it has been known from Taylor in U.S. Pat. No. 3,337,322 to introduce a protective gas comprising from 0.25 to 3.0 percent hydrogen in nitrogen into a plenum near the inlet end of a chamber while introducing a protective gas comprising from 3.0 to 10 percent hydrogen in nitrogen into the plenum near the outlet end of the chamber. These gases of differing constituent concentrations generally flow downwardly through spaces and openings between adjacent refractory pieces of which the ceiling is comprised. The rate of gas introduction and its flow through the ceiling are largely dictated by a requirement that there be little or no cycling of gas flow upwardly, as well as downwardly, through the ceiling and by a requirement that electrical apparatus or the like located in the space or plenum above the ceiling be kept relatively cool.

Because of the required reducing character of the gases filling the headspace of a forming chamber beneath its ceiling and in the vicinity of its pool of molten metal, all of the gases entering the chamber in a method such as that of Taylor must contain a reducing constituent such as hydrogen. This is so then for all gas introduced into the chamber even if its principal function is to provide cooling for electrical equipment and a pressure seal for the chamber. This is wasteful of hydrogen and may in some instances be detrimental, as for example in the flames or "sting out" associated with the use of excessive hydrogen.

This invention provides for a more conservative use of hydrogen or other reducing gases and for the separation of the functions of introduced protective gases into their component functions which may then be individually controlled and optimized.

SUMMARY OF THE INVENTION

In the practice of this invention at least two different protective gases are introduced into a glass forming chamber. A first of these protective gases is characterized as a reducing protective gas and is introduced into a headspace of the forming chamber in the vicinity of a pool of molten metal that is to be protected from oxidation. A second of these protective gases is characterized as an inert protective gas and is introduced into a service space or plenum of the chamber which is separated from the headspace by a ceiling or roof, which, preferably, is sufficiently open or permeable to admit at least a portion of the inert protective gas into the headspace.

The reducing protective gas may be forming gas, coal gas, a mixture of an inert gas with a reducing gas or the like. The inert protective gas may be nitrogen, carbon dioxide or the like and may contain, if desired, a small quantity of a reducing gas, such as hydrogen or carbon monoxide.

The reducing protective gas may be introduced directly into the headspace of a glass forming chamber from an external source, such as a storage vessel or a gas generation or production facility. It is preferred, however, to first direct the reducing protective gas through one or more preheaters to heat it to a temperature sufficient to avoid unwanted cooling of the chamber headspace. The preheaters are preferably heat exchangers located in the service space of the chamber so that as the reducing protective gas is heated, structural elements and service equipment in the service space are cooled to prolong their useful lives.

Preferably, a plurality of heat exchangers are provided in the upper portion or service space of a glass forming chamber to cool electrical connections or the like in the service space and to preheat reducing protective atmosphere gases, including a reducing gas, such as hydrogen, prior to introducing them into the chamber at selected locations in the headspace of the chamber, generally remote from the heat exchangers. Also, facilities are provided to introduce an inert gas, such as nitrogen, into the upper portion of the glass forming chamber to seal the chamber and further cool the electrical connections in the service space.

Reducing protective gases, such as forming gas, coal gas, carbon monoxide, mixtures of nitrogen and hydrogen and the like, are heated in the heat exchangers and then introduced into the headspace of the glass forming chamber above a pool of molten metal in the chamber and preferably along the sides of the chamber. When, as is common, the molten metal used in the forming chamber as a support for glass during forming is tin or an alloy of tin, a mixture of nitrogen and hydrogen is a preferred reducing protective gas.

The reducing protective gas is preferably introduced into the forming chamber as a gentle flow of gas directed transversely across the chamber towards its central portion and preferably along a slightly upward path toward a ceiling or roof extending over the pool of molten metal in the chamber. The ceiling or roof separates the forming chamber into its two compartments or spaces: the headspace beneath the ceiling and the service space or plenum above the ceiling. Such a ceiling provides a body to which heat is radiated from the glass and may include electric heating elements for controlling the rate and direction of heat transfer between the glass and its surroundings, including the ceiling and heaters. By directing the incoming reducing protective gas slightly upwardly, the heaters and ceiling are continually swept clean of any particulate or fluid compartments that might otherwise build up and then occasionally drop onto the glass. In this way the incidence of point or particle defects in the glass may be minimized without resort to the external gas cleaning systems known in the art.

It is desirable to introduce a substantial portion of the introduced reducing protective gas at locations generally well downstream from the inlet or hot end of a forming chamber where molten glass is fed to the chamber. Preferably, a given stream of reducing protective gas flows through a heat exchanger located at a first distance from the hot end of a forming chamber and then through a conduit which leads to a gas distribution device inside the forming chamber a second distance from the hot end of the forming chamber which is greater than the described first distance. In the vicinity of the exit or cold end of a forming chamber it is desirable to provide a heat exchanger close to the exit and to direct protective gas through it and then into the chamber at a location farther upstream from the exit than the heat exchanger. This is a different spacing than that employed generally for heat exchangers and gas distribution devices over the full length of a forming chamber, but it is a particularly useful arrangement where heaters are provided at the exit of the chamber to control the temperature of glass as it is removed from its supporting molten metal.

The novel structural features of a forming chamber employed in the practice of this invention are the invention of J. W. Kompare et al as described in a copending application filed concurrently with this application and are integrated into a glass forming chamber which includes many conventional features as well. In general, a glass forming chamber in which this invention is practiced is one having an enclosed casing or shell, a liner, a pool of molten metal, a headspace, a roof or ceiling and a service space above the ceiling but within the casing which, in a conventional chamber, serves as a plenum.

More specifically, a glass forming chamber used in the practice of this invention includes an outer shell or casing of metal (such as steel) or other gas impervious material. Within the bottom portion of the casing is a refractory bottom and sides for containing a pool of molten metal. The bottom may be lined with powdered graphite or like material as described in U.S. Pat. No. 3,584,475 to Galey and Sensi. Inside the chamber is a refractory ceiling or roof mounted within the upper portion of the casing and extending over the pool of molten metal. The ceiling divides the enclosed chamber into two spaces; a headspace immediately over the molten metal and below the refractory ceiling and an enclosed plenum or service space above the refractory ceiling and inside the upper portion of the chamber casing.

Extending into the headspace of the chamber through the refractory ceiling are electrical heating elements to control the temperature of glass as it advances through the forming chamber where it is formed into a continuous sheet or ribbon of glass. These electrical heating elements are connected to electrical connectors located in the service space above the ceiling. These connectors are, in turn, connected to a source of electrical power. The entire plenum or service space of the chamber is pressurized slightly with the inert protective gas to act as a seal against the ingress of oxygen or contaminants from the outside environment into the chamber. The preferred inert gas is nitrogen or a mixture of nitrogen and carbon dioxide. Even though the inert gas is preferably truly inert, it may contain some small amount of a reducing gas, such as hydrogen, although the inert gas mixture is substantially less reducing than the reducing protective gas, in any event.

A plurality of heat exchangers are positioned within the service space in closely spaced relation to the electrical connectors serving the heaters. The heat exchangers are provided with inlet conduits connected to a source of reducing protective atmosphere gases. During operation, reducing protective atmosphere gases are introduced through the heat exchangers in order to extract heat from the associated electrical connectors. This maintains the connectors at suitable operating temperatures and, thus, extends their useful lives. Connected to the outlet of each heat exchanger, is a conduit which is preferably thermally insulated so that the heated reducing gases coming from the heat exchangers are maintained as hot as desired. These conduits are directed along the forming chamber and into the forming chamber terminating in gas distribution manifolds inside the headspace of the chamber beneath its ceiling and above the pool of molten metal in the bottom of the chamber.

The gas distribution manifolds are preferably positioned along the side walls of the chamber at locations near the exit end of the chamber and along its mid-section so that preheated reducing gases are introduced into what would normally be colder portions of the forming chamber. The gas distribution manifolds are preferably designed to introduce the preheated reducing gases into the headspace in a manner so that the gases flow upwardly and inwardly across the electrical heaters in the bottom of the ceiling in order to continuously sweep the heaters and the ceiling and maintain the chamber free of contaminants that might fall on an advancing ribbon of glass resulting in point defects in the glass.

Each of the gas distribution manifolds is preferably provided with a control device such as a control valve for regulating the flow of atmosphere gases into the chamber at selected locations along the length of the chamber. This provides one of the extremely beneficial effects of this invention, namely the ability to selectively control the introduction of reducing gases into the forming chamber without indiscriminately introducing all protective atmosphere gases throughout the entire chamber by flow through a ceiling of indeterminate porosity throughout its length and width. By providing heat exchangers adjacent the electrical connectors in the headspace, it is possible to direct a greater flow of reducing gases through those heat exchangers located near the inlet or hot end of the forming chamber and less flow of atmosphere gases through the heat exchangers located at the exit or cold end of the forming chamber. Since the temperature of the electrical connectors of the hot end of the chamber tends to inherently be much higher than the temperature of the connectors of the cold end of the chamber, those connectors are normally subject to much greater deterioration of performance than the others. When practicing this invention using the preferred apparatus of Kompare et al, it is possible to keep the temperature of the electrical connectors at the hot end of the forming chamber sufficiently low so that they do not deteriorate sufficiently over the life of a forming chamber to noticeably degrade their performance as is possible when employing an apparatus such as conventionally used.

It is possible, if additional cooling of bus bars is desired, to provide additional heat exchangers in the vicinity of the electrical connectors which are provided with coolant that is not to be directed into the forming chamber itself. For example, even water may be used as a coolant in such heat exchangers to specifically and efficiently reduce the temperature in the vicinity of electrical connectors in the hot end of a forming chamber. A protective, nonoxidizing gas may be fed through such additional heat exchangers and then directed through external cooling means such as a refrigeration unit and recirculated through the such exchangers located in service space of the forming chamber. It is also possible to connect the outlet conduit from the heat exchanger in the service space of the forming chamber to observation windows in the forming chamber side walls such as described by Hughes, Cramer or Jago et al in their respective patents, U.S. Pat. No. 3,387,551, U.S. Pat. No. 3,725,028 and U.S. Pat. No. 3,473,905.

In the practice of this invention, the reducing protective atmosphere gases introduced into the headspace of a forming chamber are selectively preheated and controllably introduced into the chamber headspace so that their flow may be varied substantially for desired control effects upon the process. This may be done separately from adjusting the flow of the inert protective gas to purge and seal the chamber casing.

This invention may be further appreciated from the drawings accompanying this description.

BRIEF DESCRIPTION OF THE DRAWINGS:

FIG. 1 is a sectional view of a longitudinal elevation of a glass forming chamber in which this invention is conveniently practiced; and FIG. 2 is a sectional plan view of the forming chamber shown in FIG. 1 taken along section lines 2—2.

DESCRIPTION OF THE PREFERRED EMBODIMENTS

A glassmaking furnace 11 having a melter to which glassmaking materials may be fed and in which they are melted to make molten glass and a refiner in which the molten glass is cooled, refined and conditioned for delivery for forming is connected to a glass delivery facility 13. A glass forming chamber 15 is connected to the molten glass delivery facility 13. The glass forming chamber 15 extends from its inlet or hot end it is connected to the glass delivery means 13 to an outlet, exit, or cold end where a facility for removing glass 17 from the chamber is provided.

The glassmaking furnace 11 includes at its discharge end, as shown in FIG. 1, a furnace bottom 19, a furnace front basin wall 21 and furnace side walls 23, which together form a container for containing molten glass as it is refined and conditioned for delivery.

The molten glass delivery facility 13 includes a threshold 25 resting on the furnace front basin wall 21. A roof 27, preferably of flat arch construction, extends from the glassmaking furnace over the discharge end of the refiner and over the threshold 25 of the delivery facility 13. Extending transversely across the delivery facility and mounted in a manner so that it can be moved upwardly or downwardly into contact with molten glass in the discharge end of the refiner is a shutoff device or tweel 29 referred to as a backup tweel. Extending transversely across the delivery facility 13 and directly over the threshold 25 is an operating tweel 31 used to meter the flow of molten glass over the threshold 25. The delivery facility further includes side jambs 33 which together with the threshold 25 and the operating tweel 31 define an opening through which molten glass flows during operation.

Within the refiner of the glassmaking furnace 11 and extending and flowing over the upstream portion of the threshold 25 is a pool of molten glass 34. The apparatus is preferably provided with a cooler 35 submerged in the pool of molten glass 34 and extending transversely across the discharge end of the refiner as taught in U.S. Pat. No. 3,843,346. Such a cooler 35 may be used to assist in establishing favorable thermal conditions for enhancing the flow of molten glass from the pool of molten glass 34 over the threshold 25 and into the forming chamber 15. Whether or not a cooler 35 is employed, it is desirable to provide a stepped bottom in the refiner of the glassmaking furnace 11 as taught in U.S. Pat. No. 3,843,346, for such an arrangement assists in cooling the molten glass approaching its delivery facility and accelerating its flow toward it near the surface of the pool of molten metal 34.

Moving on downstream through the apparatus and noting the various features of the forming chamber 15, it may be seen that the forming chamber includes a bottom casing 41 and an upper casing 42. These casings, 41 and 42, form a box-like shell which surrounds the forming chamber. The casings, 41 and 42, are preferably constructed of an impervious material which is not readily penetrated by either a molten metal such as tin or gases such as air from the outside environment. Within the bottom casing 41 is a bottom liner 43, preferably comprising a refractory material, which includes bottom side walls, also preferably comprising refractory materials. The upper casing 42 includes upper side walls 45 and a ceiling 47 mounted above the side walls 45 and extending over the bottom portion of the forming chamber. The bottom portion of the forming chamber further includes an exit lip 51 which, together with the bottom side walls, the threshold 25 and the chamber bottom 43, provides a container for holding a pool of molten metal.

At the inlet end of the forming chamber beneath the threshold 25 there is provided a casing cooling and seal 53 which bonds the thresholds 25 to the bottom of the forming chamber 43 and insures against potential leakage of molten metal from the forming chamber. Mounted downstream of the exit lip 51 is an exit lip casing 55 which may or may not be cooled in a conventional manner as desired. Extending transversely across the inlet end of the forming chamber downstream of the operating tweel and above the bottom of the forming chamber 43 is a lintel 57 which is employed to connect and seal the upper portion of the forming chamber to the roof 27 of the delivery facility.

At the inlet end of the forming chamber there are guides 59 which extend downstream a short distance from the jambs 33 and serve to establish and maintain the width of a delivered layer of molten glass immediately upon its delivery to the forming chamber. A pool of molten metal, preferably molten tin, 61 is provided within the bottom portion of the forming chamber in the container formed by the threshold 25, the bottom 43, the bottom side walls and the exit lip 51. It is on this pool of molten tin 61 that molten glass is delivered, cooled and formed into a continuous ribbon or sheet of flat glass 62. In FIG. 1 such a continuous sheet of glass 62 is seen advancing along the surface of the pool of molten tin 61.

The space provided between the pool of molten metal 61 or the glass 62 supported on it and the ceiling 47 of the forming chamber is referred to as a headspace 63. At the inlet end of the forming chamber it may be desirable to include one or more heaters 64 or a like device, such as a reflector, to initially retard the rate of heat transfer from the delivered glass during its initial residence on the molten tin 61 prior to its being formed to a finished sheet of flat glass.

Looking now at the main portion of the forming chamber from the guides 59 downstream through to the end of the chamber, it is seen that the upper portion of the chamber includes, in addition to the headspace 63, a plenum or service space 65 above the ceiling 47 but within the upper casing 42. Just downstream of the guides 59 and within the headspace 63 of the chamber there are provided elements for controlling the formation of a continuous sheet of flat glass. These include edge rolls 67 or other means for grasping the edges of an advancing body of glass and applying outward tractive forces to the glass. Tractive forces, when applied to the glass, are useful for attenuating it or stretching it to a desired width and thickness. There are also provided coolers 69 or the like for selectively extracting heat from the glass, particularly as it advances toward the exit or cold end of the forming chamber. Also provided within the headspace 63 of the forming chamber are electric heating elements 71 which extend into the headspace and which are used to control the rate and direction of radiant heat transfer between the glass and its surroundings. Heaters 71 are also conveniently located near the exit or cold end of the forming chamber in order to selectively adjust and maintain the temperature of glass as it is prepared for removal from the molten metal and withdrawal from the forming chamber.

The heaters 71 extend through and are supported by the ceiling 47. They are connected to bus bars 73 which extend through electrically insulated collars mounted in the upper casing 42 and are connected to a source of electric power (not shown). The heaters 71 are preferably connected to the bus bars 73 in a conventional manner by connecting straps. Electric power is provided to the bus bars by conventional power cables.

Moving to the exit end of the forming chamber, the glass withdrawal facility 17 is seen to include liftout rolls 81 which are used to support, lift and apply traction to a continuous sheet of glass that has been formed in the forming chamber and to convey the sheet of glass from its supporting pool of molten metal and outwardly from the forming chamber. Mounted in the upper potion of the glass withdrawal facility 17 are drapes 83 or other convenient sealing members to prevent the ingress of unwanted air from the outside environment which could serve to oxidize molten metal in the forming chamber.

The present invention may be appreciated within the context of the already described apparatus and its functions with reference to FIGS. 1 and 2. Mounted within the plenum or service space 65 of the forming chamber 15 are heat exchangers 91 through which the reducing protective gases are directed. The heat exchangers 91 are connected to inlet conduits 93, and longitudinal conduits 95 run from the heat exchangers 91 to distribution lines which connect to gas distribution headers or manifolds 99 within the headspace 63 of the forming chamber.

The gas distribution headers 99 are provided with orifices and the reducing protective gas which is introduced through the heat exchangers 91 and to the headers 99 is ultimately distributed through these orifices into the headspace 63.

The forming chamber is preferably provided with atmosphere discharge outlets or vents 117 for continuously or intermittently discharging some spent atmosphere gases from the headspace of the chamber. Otherwise all spent gases leak from the chamber and flow out from its outlet as such outflow prevents the ingress of air from outside the chamber. The chamber is also provided with gas inlet conduits 119 connected to the chamber through its upper casing. The inert protective gas is introduced through these conduits 119. While in conventional practice all protective gas entering a forming chamber (except that entering through windows and seals) may be directed into the upper portion of the chamber, only a limited amount is introduced in this manner when practicing the preferred embodiments of this invention. A sufficient amount of inert protective gas is introduced through the conduits 119 to slightly pressurize and seal the service space of the chamber. This prevents uncontrolled flow of gases from the headspace into the service space. Since such gases contain contaminants acquired through contact with the molten metal and molten glass, they can have a detrimental effect upon ceiling refractories and equipment in the service space if allowed to freely flow through the ceiling from the headspace to the service space.

One of the beneficial effects of introducing an inert protective gas into the service space while introducing a reducing protective gas directly into the headspace is that waste of reducing gas is avoided. Another benefit is that the reducing conditions throughout the length of the forming chamber may be effectively controlled by the adjustment of reducing protective gas flow to individual distribution headers without requiring several external gas mixers to operate at differing settings to serve various parts of the chamber. Instead, one reducing protective gas is controllably distributed and leakage of the inert protective gas through the ceiling serves to differentially dilute the gas in the headspace along the length of the chamber.

By practicing this invention, the concentration of a reducing gas, such as hydrogen, may be gently decreased toward the inlet end of a chamber to prevent the formation of small bubbles or seeds in the glass at the inlet end of the chamber while still providing sufficient reducing gas farther from the inlet end to prevent oxidation of tin or the like comprising the supporting molten metal.

While this invention has been described with reference to particular embodiments of it, those skilled in the art will appreciate that variants of these embodiments may be practiced according to the spirit of this invention. Thus, this invention is not intended to be limited to the preferred embodiments disclosed in detail here.

I claim:

1. In the method of making flat glass wherein molten glass is delivered onto the surface of a pool of molten metal comprising a substantial amount of tin in an enclosed chamber providing headspace extending directly over the pool of molten metal and a service space extending over the headspace and separated from it by a ceiling that is permeable to gas, wherein the delivered glass is cooled and formed into a dimensionally stable, continuous sheet of glass while being advanced along the surface of the pool of molten metal, wherein the formed dimensionally stable, continuous sheet of glass is withdrawn from the pool of molten metal and from the enclosed chamber, and wherein sufficient protective gases are introduced into the enclosed chamber to prevent the substantial oxidation of the molten metal, the improvement comprising a. introducing a first protective gas into the service space of the chamber at a sufficient rate to pressurize the service space with a pressure exceeding that of the outside environment, and b. introducing a second protective gas into the headspace of the chamber at a plurality of locations closely spaced from the advancing glass, which second protective gas is substantially more reducing than the fist protective gas.

2. The method according to claim 1 wherein the first protective gas comprises nitrogen and the second protective gas comprises a mixture of nitrogen and hydrogen.

3. The method according to claim 2 wherein the second protective gas comprises from 4 to 10 percent by volume hydrogen and 96 to 90 percent by volume nitrogen.

4. The method according to claim 1 wherein the volume of the first protective gas which is introduced into the chamber is from one-half to twice the volume of the second protective gas which is introduced into the chamber.

5. The method according to claim 4 wherein the volume of the first protective gas and the volume of the second protective gas introduced into the chamber are substantially equal.

6. The method according to claim 1 wherein the second protective gas is introduced into the headspace of the chamber at a plurality of locations along the length of the chamber from where the molten glass is delivered to the chamber to where the continuous sheet of glass is withdrawn from the chamber and wherein the rate at which the second protective gas is introduced into the headspace at locations close to where the molten glass is delivered is sufficiently less than the rate at which the second protective gas is introduced into the headspace at locations close to where the continuous sheet of glass is withdrawn to provide for sufficient dilution of the second protective gas by the first protective gas passing through the gas permeable ceiling close to where the molten glass is delivered to cause the diluted protective gas there to be sufficiently inert to substantially prevent the formation of bubbles in the molten glass upon delivery.

7. The method according to claim 1 wherein the first protective gas is introduced at a rate and pressure sufficient to provide a higher pressure in the service space than in the headspace of the chamber.

* * * * *